US008758115B2

(12) United States Patent
Roemer et al.

(10) Patent No.: US 8,758,115 B2
(45) Date of Patent: Jun. 24, 2014

(54) ACCUMULATION GAME OFFERING RESPINS FOR ADDITIONAL WAGERS

(75) Inventors: Micki Roemer, Austin, TX (US); Jenny Holaday, Birmingham, MI (US); Clint Owen, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 156 days.

(21) Appl. No.: 13/221,815

(22) Filed: Aug. 30, 2011

(65) Prior Publication Data

US 2012/0122544 A1 May 17, 2012

Related U.S. Application Data

(60) Provisional application No. 61/413,463, filed on Nov. 14, 2010.

(51) Int. Cl.
*A63F 13/00* (2014.01)

(52) U.S. Cl.
USPC .............................................. 463/20; 463/21

(58) Field of Classification Search
USPC .............................................. 463/20, 21, 25
See application file for complete search history.

(56) References Cited

U.S. PATENT DOCUMENTS

| | | | | |
|---|---|---|---|---|
| 5,704,835 | A | 1/1998 | Dietz, II | |
| 6,641,477 | B1 * | 11/2003 | Dietz, II | 463/20 |
| 6,739,970 | B2 | 5/2004 | Luciano | |
| 7,238,110 | B2 | 7/2007 | Glavich et al. | |
| 7,393,278 | B2 | 7/2008 | Gerson et al. | |
| 2003/0224849 | A1 | 12/2003 | Geiger | |
| 2004/0092300 | A1 | 5/2004 | Gauselmann | |
| 2005/0043082 | A1 | 2/2005 | Peterson et al. | |
| 2005/0075163 | A1 * | 4/2005 | Cuddy et al. | 463/20 |
| 2006/0035700 | A1 | 2/2006 | Van Asdale | |
| 2006/0068893 | A1 | 3/2006 | Jaffe et al. | |
| 2006/0148559 | A1 | 7/2006 | Jordan et al. | |
| 2006/0160595 | A1 * | 7/2006 | Gerson et al. | 463/16 |
| 2006/0252495 | A1 * | 11/2006 | Gerson et al. | 463/20 |
| 2007/0254735 | A1 | 11/2007 | Marks et al. | |
| 2008/0070681 | A1 | 3/2008 | Marks et al. | |
| 2009/0075722 | A1 | 3/2009 | Louie et al. | |
| 2009/0104977 | A1 | 4/2009 | Zielinski | |
| 2009/0124343 | A1 | 5/2009 | Nelson et al. | |

FOREIGN PATENT DOCUMENTS

| | | | |
|---|---|---|---|
| EP | 0 984 409 | A2 | 3/2000 |

* cited by examiner

*Primary Examiner* — Arthur O Hall
*Assistant Examiner* — Allen Chan
(74) *Attorney, Agent, or Firm* — Nathan Calvert, Esq.; Russell D. Culbertson, Esq.; JP Cody, Esq.

(57) ABSTRACT

A free spin game accumulates symbols to win a prize. An offer is made for the player to purchase additional "free spins" if the game is within a designated threshold number of accumulated symbols for winning a free prize. That is, the player can purchase more spins if they have almost achieved a prize. These re-spins are offered to the player at a price based on expected values of all possible prizes that could be achieved in the re-spin.

20 Claims, 9 Drawing Sheets

ACCUMULATION GAME OFFERING RESPINS FOR ADDITIONAL WAGERS

CROSS-REFERENCE TO RELATED APPLICATION

The Applicants claim the benefit, under 35 U.S.C. §119(e), of U.S. Provisional Patent Application No. 61/413,463 filed Nov. 14, 2010, and entitled "Accumulation Game Offering Respins for Additional Wagers." The entire content of this provisional application is incorporated herein by this reference.

TECHNICAL FIELD OF THE INVENTION

This invention relates to wagering games that accumulate symbols to award a prize, and more specifically to gaming systems where the player can purchase re-spins for the purpose of accumulating additional symbols.

BACKGROUND OF THE INVENTION

In the casino gaming industry, reel-based slot machines often have features that include a re-spin of the reels to add excitement to the game. One example of a game that offers re-spins is U.S. Pat. No. 5,704,835 to Dietz. In this example, the player initiates the game and the gaming machine displays an initial set of results. After the initial results, the player then selects one or more symbols (but not all) for a re-spin. In this example game, the player always is given the option of having a re-spin. Another example re-spin game is found in U.S. Publication No. 2007/0254735 by Marks, et al. In this example the player initiates the game, the gaming station displays the initial set of results, and awards any winnings The gaming machine then further allows the player to re-spin all reels which do not contain a stop symbol. After this spin, any new winnings are awarded, and the gaming machine allows the player to re-spin the reels that still do not have a stop symbol. The game continues until all reels have a stop symbol.

A further example of a game that includes re-spins is U.S. Pat. No. 7,393,278 to Gerson, et al. In this example, the game station displays an initial set of results. If there is a winning combination in these results the gaming machine awards the winnings If there is no winning combination, then the gaming machine allows the player to select certain reels for re-spin. The gaming machine then computes the price for this re-spin of the selected reels. The gaming machine at this point notifies the player of the cost and allows the player to accept or decline the re-spin. If the player has a winning combination the gaming machine then awards the winnings If there is no winning combination, the gaming machine then continues to offer re-spins.

These examples illustrate various approaches to fill a need in the gaming industry. What is needed are exciting new re-spin features that increase player enjoyment and meet the legal requirements in the relevant jurisdictions.

SUMMARY OF THE INVENTION

Methods, systems, and software products are disclosed for providing an entertaining and highly original approach to a game in which the player accumulates symbols for an award, and where the player has the option of purchasing re-spin if they have almost achieved an award.

A method for providing game services includes receiving a game play request with an associated wager, at a gaming machine. At some point after the game play request and in response to the game play request, the process displays a matrix of symbol locations comprised of multiple reels each including one or more symbol locations. The game conducts a designated number of spins of the reels, which each produce a spin result, and collects or accumulates particular target symbols that may appear in each result. If enough symbols of a particular type are collected, a prize is won. The game displays an indication that the respective target symbol is accumulated. If after the designated number of spins of the reels have been exhausted, the process determines whether there is an amount of accumulated target symbols of any of the symbol types within a designated threshold such that they almost qualify for an award. In this case, the game offers the player a chance to continue trying for an award by wagering, or buying, another spin. In one version this is called a "buy a free-spin" feature. The price of this re-spin is dependent on an expected value for the re-spin considering how close the player is to achieving an award for each of the symbol types and choosing the price based at least in part on the expected value. When the game has determined the re-spin price, the game displays a notification informing the player indicating availability of the re-spin of the reels, including the previously determined price. If the player chooses to wager for the re-spin, the game receives a further wager at the determined price for the re-spin of the reels, and in response to receiving the further wager, conducts the re-spin to produce a re-spin result. This re-spin result has a chance to include one or more target symbols of one or more types. After the reels are spun, any further target symbols are accumulated in the accumulation area and any prizes that are won are awarded.

The invention may also be embodied as a gaming system including a gaming machine with a player interface. The interface will receive a game play request with an associated wager. The gaming machine also includes a display showing matrix of symbol locations comprised of multiple reels each including one or more symbol locations. A game controller is provided for determining game play results for a designated number of spins of the reels, each spin producing a spin result, each spin result having a chance to include one or more target symbols of one or more types. A second display will show an indication that the respective target symbol is accumulated. After all the spins of the game are used up, the game controller will then determine if the amount of accumulated target symbols of any particular type is within a designated threshold such that they almost qualify for an award. If the game controller determines that there are almost enough symbols of any particular type to achieve a prize, the game controller then determines the price of a re-spin by determining an expected value for the re-spin considering how close the player is to achieving an award for each of the symbol types and choosing the price based at least in part on the expected value. At this point, the video screen displays a notification informing the player indicating availability of the re-spin of the reels, including the previously determined price. The player can then choose whether to place an additional wager for a re-spin. If the player uses the re-spin, the game controller conducts the re-spin to produce a re-spin result, the re-spin result having a chance to include one or more target symbols of one or more types, in response to receiving the further wager. These results also accumulate any further target symbols in the accumulation area, and if there are enough the machine awards any prizes won.

Another version of the invention is a computer program stored on a computer readable medium. The software version is, of course, typically designed to be executed by a gaming machine or networked gaming system. The software includes multiple portions of computer executable code referred to as program code. Gaming results are provided in response to a wager and displayed by display program code that generates simulated slot reels each including one or more symbol locations. The program also has game controller program code for determining game play results for a designated number of spins of the reels, each spin producing a spin result, each spin result having a chance to include one or more target symbols of one or more types. Included in the program is symbol accumulation program code that counts or gathers each target symbol included in the spin results, and displays the accumulated symbol in a designated display area for its respective target symbol type. After a designated number of re-spins is complete, the program will determine whether the amount of accumulated target symbols of any of the symbol types are within a designated threshold such that they almost qualify for an award. If so, the program will decide to offer the player the ability to buy a re-spin. The program determines a price for the re-spin by determining an expected value for the re-spin considering how close the player is to achieving an award for each of the symbol types and choosing the price based at least in part on the expected value. After the cost of the re-spin has been determined, the program displays a notification informing the player indicating availability of the re-spin of the reels, and include the previously determined price. If the player accepts the re-spin, the program receives a further wager at the determined price for the re-spin of the reels, and conducts the re-spin to produce a re-spin result. Of course any further target symbols produced by the re-spin will be accumulated in the accumulation area, and any prizes won will be awarded.

Different features may be included in different versions of the invention. Some variations offer re-spins when the accumulated symbols are one symbol away from a prize. Other versions set this threshold differently for different types of target symbols. One version provides a larger threshold for larger awards which may require more accumulated symbols. Another possible feature is setting the price of a re-spin to be exactly equal to the expected value of the re-spin, or, alternately, to this expected value plus a house premium amount (also known as the house edge). Separate re-spins may be offered for a chance to receive different types of target symbols. After having received a refusal to re-spin from the player, the game would then display a second notification informing the player indicating a second availability of the re-spin based on the target symbol of a second type. One preferred version of the invention provides the "buy a free-spin" feature as part of a free-spin bonus round. However, other versions may provide it in a base round. For example, each base round may consist of multiple spins, which can accumulate symbols.

These and other advantages and features of the invention will be apparent from the following description of the illustrative embodiments, considered along with the accompanying drawings.

DESCRIPTION OF ILLUSTRATIVE EMBODIMENTS

Figure 1:
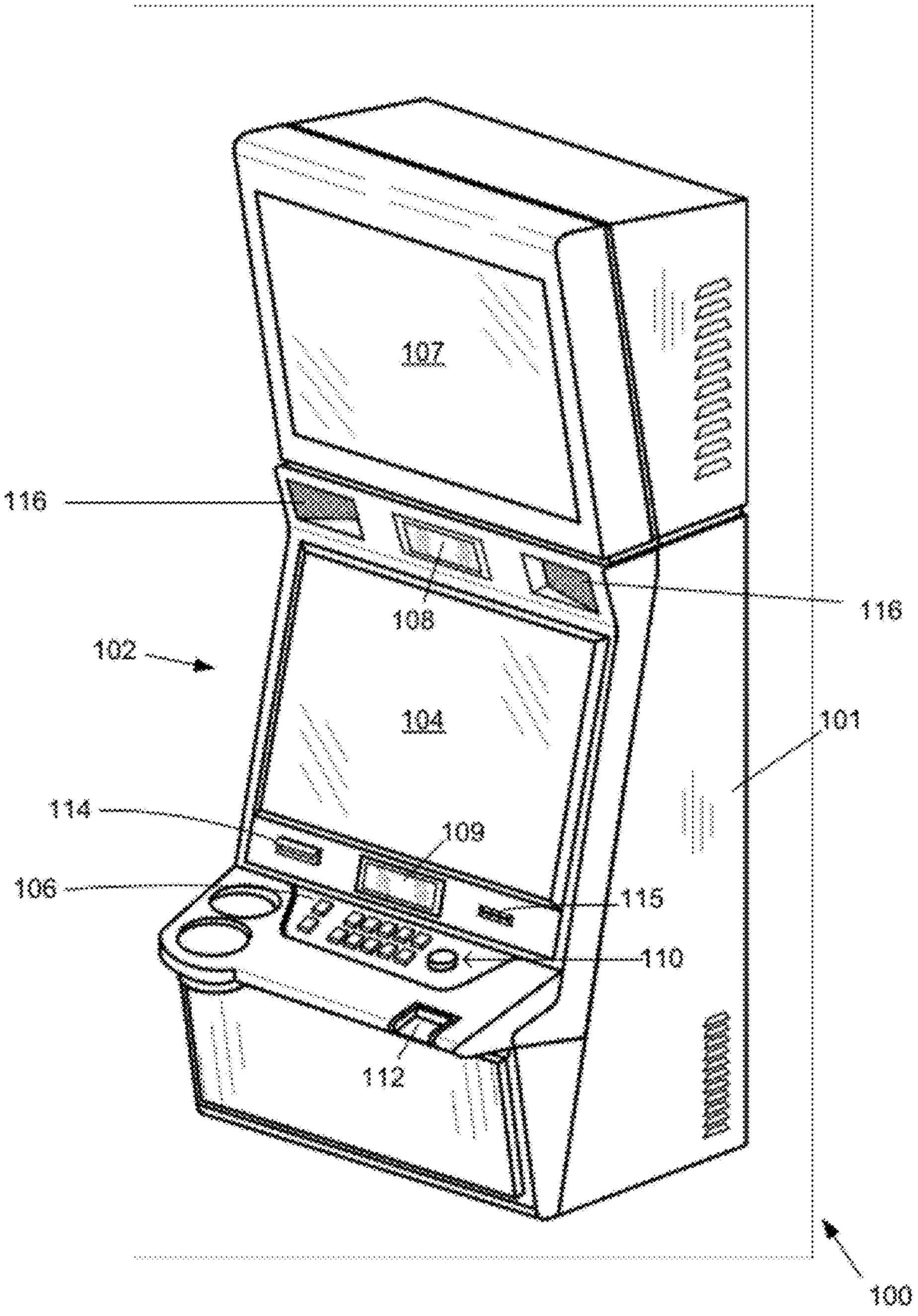
FIG. 1 is a front perspective view of a gaming machine which may be used in a gaming system embodying the principles of the present invention.
Figure 2:
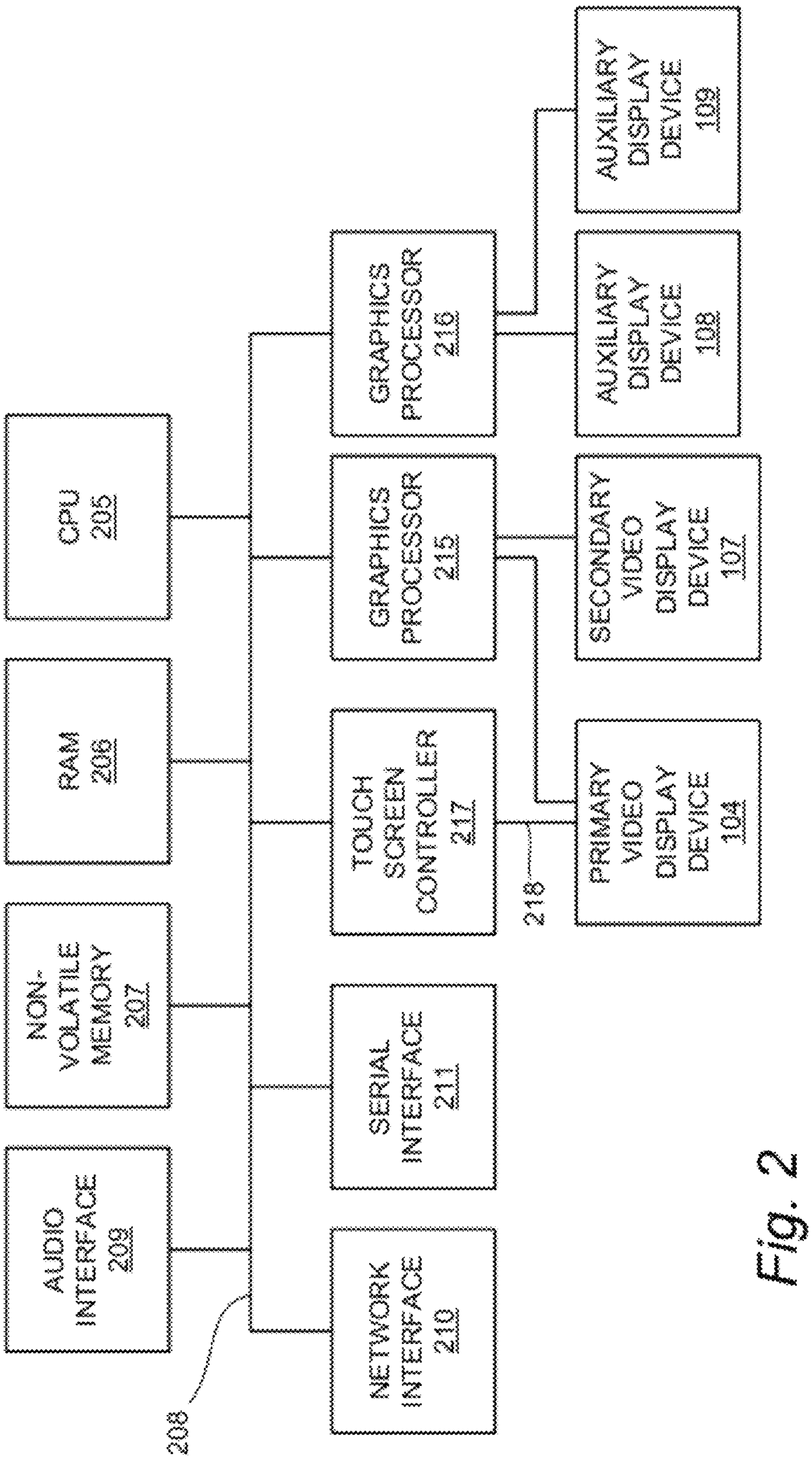
FIG. 2 is a diagrammatic representation showing various electronic components of the gaming machine shown in FIG. 1 together with additional gaming system components.

FIG. 1 shows a gaming machine 100 that may be used to implement a re-spin purchase game according to the present invention. The block diagram of FIG. 2 shows further details of gaming machine 100. Referring to FIG. 1, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that each display device referenced herein may include any suitable display device including a cathode ray tube, liquid crystal display, plasma display, LED display, or any other type of display device currently known or that may be developed in the future.

Gaming machine 100, illustrated in FIG. 1, also includes a number of mechanical control buttons 110 mounted on ledge 106. These control buttons 110 may allow a player to select a bet level, select pay lines, select a type of game or game feature, and actually start a play in a primary game. Other forms of gaming machines according to the invention may include switches, joysticks, or other mechanical input devices, and/or virtual buttons and other controls implemented on a suitable touch screen video display. For example, primary video display device 104 in gaming machine 100 provides a convenient display device for implementing touch screen controls.

It will be appreciated that gaming machines may also include a number of other player interface devices in addition to devices that are considered player controls for use in playing a particular game. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the user's playing experience. Numerous other types of devices may be included in gaming machines that may be used according to the present invention.

FIG. 2 shows that gaming machine 100 includes a central processing unit (CPU) 205 along with random access memory 206 and nonvolatile memory or storage device 207. All of these devices are connected on a system bus 208 with an audio interface device 209, a network interface 210, and a serial interface 211. A graphics processor 215 is also connected on bus 208 and is connected to drive primary video display device 104 and secondary video display device 107 (both mounted on cabinet 101 as shown in FIG. 1). A second graphics processor 216 is also connected on bus 208 in this example to drive the auxiliary display devices 108 and 109 also shown in FIG. 1. As shown in FIG. 2, gaming machine 100 also includes a touch screen controller 217 connected to system bus 208. Touch screen controller 217 is also connected via signal path 218 to receive signals from a touch screen element associated with primary video display device 104. It will be appreciated that the touch screen element itself typically comprises a thin film that is secured over the display surface of primary video display device 104. The touch screen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 2 are elements commonly associated with a personal computer. These elements are preferably mounted on a standard personal computer chassis and housed in a standard personal computer housing which is itself mounted in cabinet 101 shown in FIG. 1. Alternatively, the various electronic components may be mounted on one or more circuit boards housed within cabinet 101 without a separate enclosure such as those found in personal computers. Those familiar with data processing systems and the various data processing elements shown in FIG. 2 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 2 as being connected directly on system bus 208 may in fact communicate with the other system components through a suitable expansion bus. Audio interface 209, for example, may be connected to the system via a PCI bus. System bus 208 is shown in FIG. 2 merely to indicate that the various components are connected in some fashion for communication with CPU 205 and is not intended to limit the invention to any particular bus architecture. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 108 and 109, it will be appreciated that CPU 205 may control all of the display devices directly without any intermediate graphics processor. The invention is not limited to any particular arrangement of processing devices for controlling the video display devices included with gaming machine 100. Also, a gaming machine implementing the present invention is not limited to any particular number of video display device or other types of display devices.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement a presentation controller for performing functions associated with a primary game that may be available through the gaming machine and may also implement a game client for directing one or more display devices at the gaming machine to display portions of a re-spin purchase game according to the present invention. CPU 205 also executes software related to communications handled through network interface 210, and software related to various peripheral devices such as those connected to the system through audio interface 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 may comprise a hard drive or other mass storage device providing storage for programs not in use or for other data generated or used in the course of gaming machine operation. Network interface 210 provides an interface to other components of a gaming system in which gaming machine 100 is included. In particular, network interface 210 provides an interface to a game controller which controls certain aspects of the multiplayer, variable re-spin purchase game as will be discussed below in connection with FIG. 3.

It should be noted that the invention is not limited to gaming machines employing the personal computer-type arrangement of processing devices and interfaces shown in example gaming machine 100. Other gaming machines through which a re-spin purchase game is implemented may include one or more special purpose processing devices to perform the various processing steps for implementing the present invention. Unlike general purpose processing devices such as CPU 205, these special purpose processing devices may not employ operational program code to direct the various processing steps.

It should also be noted that the invention is not limited to gaming machines including only video display devices for conveying results. It is possible to implement a variable re-spin purchase game within the scope of the present invention using an electro mechanical arrangement or even a purely mechanical arrangement for displaying the symbols needed to complete a re-spin purchase game as described herein. However, other embodiments of the invention utilize one or more video display devices for displaying the spinning reels, the accumulated symbols, and the re-spin purchase offer. For example, a gaming machine suitable for providing a variable re-spin purchase game may include a mechanical reel-type display rather than a video-type display device for displaying results in a primary game, and include a video display device for presenting the variable re-spin purchase game as a bonus game.

Figure 3:
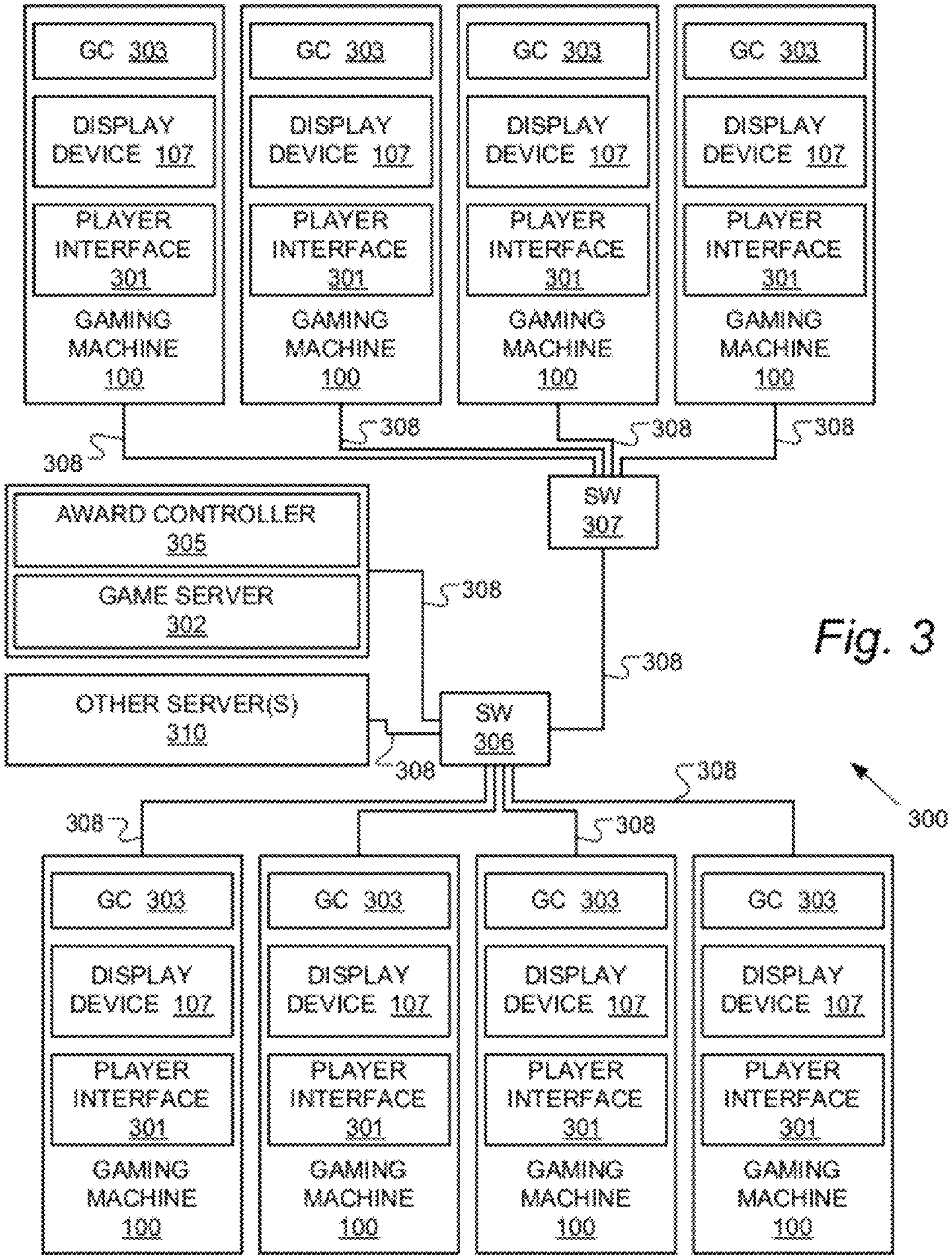
FIG. 3 is a system diagram of a gaming system according to one embodiment of the present invention.

Referring now to FIG. 3, a gaming system 300 according to the present invention includes a number of gaming machines, each comprising a gaming machine 100 in this example implementation. For purposes of describing system 300, each gaming machine 100 in FIG. 3 is shown as including a video display device 107 and a player interface that may include buttons, switches, or other physical controls and/or touch screen controls as discussed above in connection with FIG. 1. This player interface is labeled 301 in FIG. 3. System 300 further includes a game server 302 and a respective game client 303 (abbreviated "GC" in FIG. 3) included with each respective gaming machine 100. In the form of the invention shown in FIG. 3 these two components, game server 302 and the game client components 303 combine to implement a game control arrangement which will be described in detail below. System 300 also includes an award controller 305, which is shown in FIG. 3 as being associated with game server 302 to indicate that the two components may be implemented through a common data processing device/computer system. Gaming machines 100, game server 302, and award controller 305 are connected in a network communication arrangement including first and second network switches 306 and 307, connected together through various wired or wireless signal paths, all shown as communications links 308 in FIG. 3.

Each gaming machine 100, and particularly player interface 301 associated with each gaming machine, allows a player to make any inputs that may be required to make the respective gaming machine eligible for a re-spin purchase game, and make selection of selectable objects displayed at the respective gaming machine in the course of a re-spin purchase game. Player interface 301 also allows a player at the gaming machine to initiate plays in a primary game available through the gaming machine in some implementations. The respective video display device 107 associated with each respective gaming machine 100 is used according to the invention to generate the graphic displays to show the various elements of a re-spin purchase game at the respective gaming machine.

The game control arrangement made up of game server 302 and the respective game client 303 at a given gaming machine functions to control the respective video display device 107 for that gaming machine to display a re-spin purchase graphic and a number of selectable objects. Award controller 305 is responsible for awarding prizes for a player's participation in a re-spin purchase game, and maintaining progressive prize information where the re-spin purchase game offers one or more progressive prizes. The network arrangement made up of network switches 306 and 307, and the various communication links 308 shown in FIG. 3 is illustrated merely as an example of a suitable communications arrangement. It should be noted that the game control arrangement, or as it is referred to generally the "game controller," may be implemented in some embodiments entirely on the gaming machine. This is especially true in jurisdictions that allow Class III gaming conducted with random number generators at each gaming machine. The present invention is not limited to any particular communications arrangement for facilitating communications between game server 302 and various gaming machines 100. Any wired or wireless communication arrangement employing any suitable communications protocols (such as TCP/IP for example) may be used in an apparatus according to the invention.

FIG. 3 shows other server(s) 310 included in the network. This illustrated "other server(s)" element 310 may include one or more data processing devices for performing various functions related to games conducted through system 300 and any other games that may be available to players through gaming machines 100. For example, apparatus 300 may be accounting servers providing support for cashless gaming or various forms of mixed cash/cashless gaming through the various gaming machines 100. In this example, an additional one of the other servers 310 will be included in apparatus 300 for supporting these types of wagering and payout systems. As another example, the various gaming machines 100 included in system 300 may allow players to participate in a game (primary game) other than a re-spin purchase game, and this other game may rely on a result identified at or in cooperation with a device that is remote from the gaming machines. In this example, another server 310 may be included in the system for identifying results for the primary game and communicating those results to the various gaming machines 100 as necessary. Generally, the other server(s) 310 shown in FIG. 3 are shown only to indicate that numerous other components may be included along with the elements that participate in providing re-spin purchase games according to the present invention. Other server(s) 310 may provide record keeping, player tracking, accounting, or result identifying services, or any other services that may be useful or necessary in a gaming system.

Figure 4:
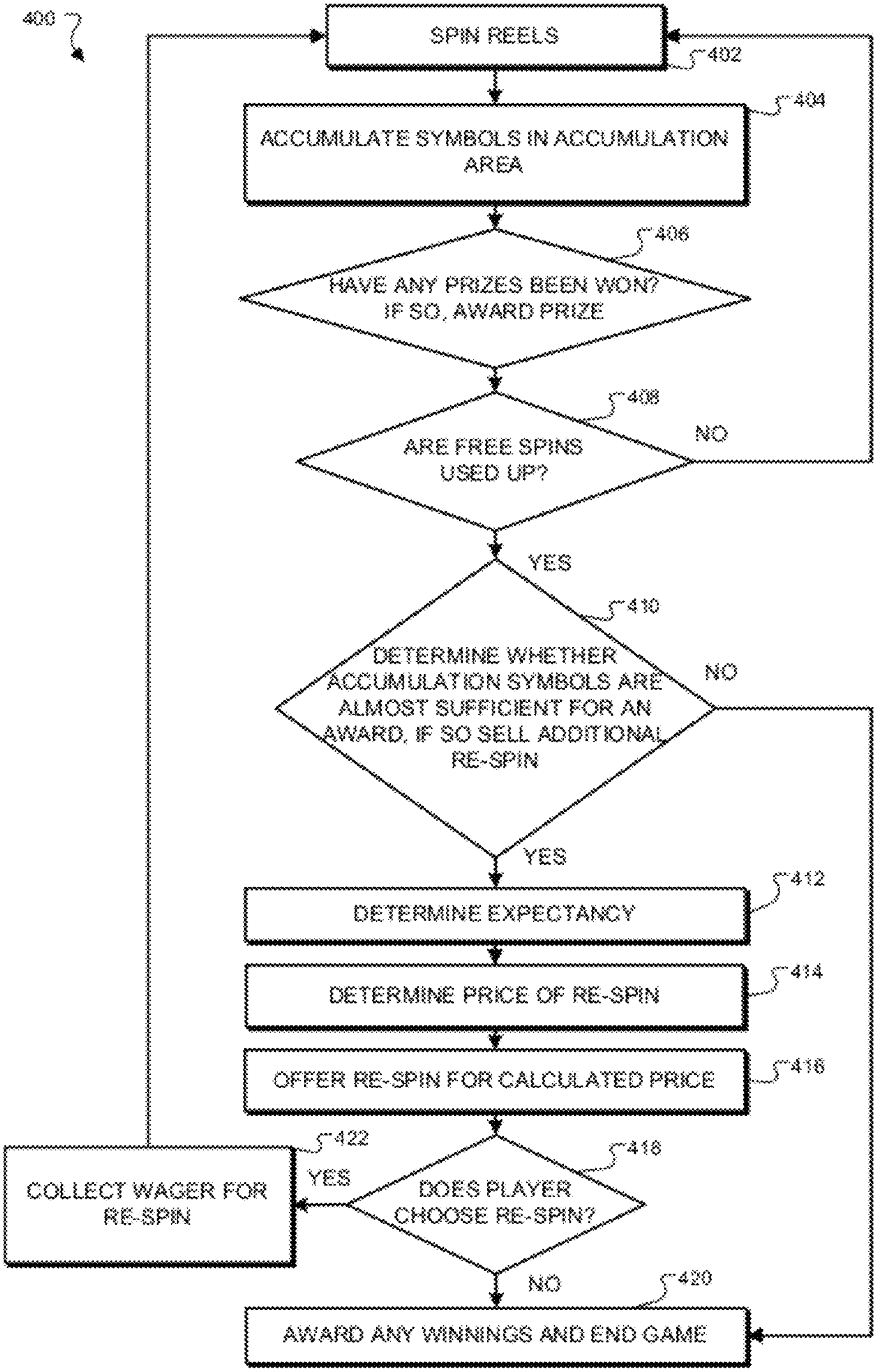
FIG. 4 is a flow chart of a purchased re-spin game according to one embodiment.

FIG. 4 is a flow chart of one embodiment of the game. The depicted process can take place in the base game, or alternately in a bonus game. Process 400 begins after having received a game play request with an associated wager at a gaming machine. Then, in step 402, the process at some point after the game play request and in response to the game play request, displays a matrix of symbol locations. This matrix comprises of multiple reels each including one or more symbol locations. The process then conducts a designated number of spins of the reels. Each spin produces a spin result, and each spin result has a chance to include one or more target symbols of one or more types. In step 404, in response to a spin result including a target symbol, the process displays an indication that the respective target symbol is accumulated. This indication is displayed in a designated display area, for its respective target symbol type, such as, for example, one of the three symbol types shown in FIG. 7. Next, in step 406, the process determines if any accumulation awards have been won. If any accumulation awards have been won, the process credits these awards before going to step 408 where the process determines if all designated spins have been used up. If there are any designated spins left, the process returns to step 402 where the reels are spun again. After the designated number of spins of the reels have been exhausted, the process at step 408 will continue on to step 410. There the process determines whether the amount of accumulated target symbols of any of the symbol types are within a designated threshold such that they almost qualify for an award. The determination can either be computed as the need arises, or can also be looked up on a previously defined table. The threshold to determine whether the accumulated symbols are "almost" sufficient can be set in several ways. One way is to set a predetermined threshold number for each target symbol, and if the gathered symbols are within the threshold, a re-spin is offered. For example, if the game requires accumulating five "yellow 7" symbols to win, and the threshold is set at three "yellow 7" symbols, then if at least 3 are accumulated, a re-spin will be offered to give the player a chance to get a fourth "yellow 7." However, if the threshold were set to four (one away from the prize), then accumulating three would not cause the re-spin to be offered. The thresholds may be provided as an absolute number or as a distance away from the prize. For example, if a prize is given for accumulating five "yellow 7" symbols, a threshold of three can be stored as "3," or as "2" (meaning "two away from a prize"). Typically the threshold is determined as part of the game design, but in some embodiments it may be determined realtime. In one embodiment, the process uses a simple threshold of one, which offers the re-spin when the accumulation of the one or more target symbols of one or more types is one symbol away from a quantity needed to qualify for an award. The threshold may vary among the different target symbols collected, or it may be the same. For example, in FIG. 7 there are three different colors of "7" symbols being collected toward three different prizes. Each one may have a different threshold.

If the process determines that the threshold is not met, and therefore no re-spin is warranted, then the process concludes in step 420. At this step, winnings are awarded, and the game play round or bonus round is concluded. If the threshold is met at step 410, the process goes on to determine the price of the re-spin, using steps 412, 414, and 416 (which may be performed in whole or in part as part of the game design process, and not in real time as the game proceeds). If the process determines that a re-spin is warranted, then in step 412 the process calculates, or determines by looking up, the expectancy of the re-spin. The expectancy is also referred to frequently as the "expected value" of a wager. It is a measure of the long-term average amount expected to be won (or lost) based on a set condition for a wager. For example, if the set condition is that the player needs to collect one more of a specific symbol to win a prize, then the expectancy can be calculated for the player winning that prize. The expectancy in the present game will vary depending on the frequency of the target symbols needed, as well as the amount of the prize in question. After the expectancy is determined, the process calculates the price for a re-spin in step 414. This step chooses the price based at least in part on the expected value. There are many ways to do this. One embodiment sets the price equal to the expected value per re-spin. In another embodiment, the price for a re-spin is calculated by setting the price equal to the expected value per re-spin, and adding a house premium amount (also known as a house edge). In some versions of the invention, the price determination at step 414 is made during the game design process. Other versions perform the step during the game. Then, the process moves to step 416, where the process displays a notification indicating availability of the re-spin. This display includes the previously determined price. In one preferred version, the re-spin automatically includes a "fair" spin, that is, provides the same chance of achieving the target symbols as that of the ordinary spins. In one variation with more than one target symbol type, the method first displays a notification informing the player indicating a first availability of the re-spin of the reels based on the target symbol of a first type, including the previously determined price. If the player refuses the re-spin, then a second notification is displayed informing the player of a second availability of the re-spin based on the target symbol of a second type.

Then, in step 418, the player chooses whether to accept the offered re-spin. If the player does not accept the re-spin, the process concludes in step 420 by awarding any winnings and ending the game. If the process is a bonus game, step 420 may conclude the base game as well, or alternately only the bonus game is concluded, and the player is returned to the base game. If the player accepts the offered re-spin, the process moves to step 422 where it receives further wager at the determined price for the re-spin of the reels. In response to receiving the further wager, the process returns to step 402, where the process conducts the re-spin to produce a re-spin result. This re-spin result has a chance to include one or more target symbols of one or more types. Of course the process then accumulates any further target symbols in the accumulation area.

Figure 5:
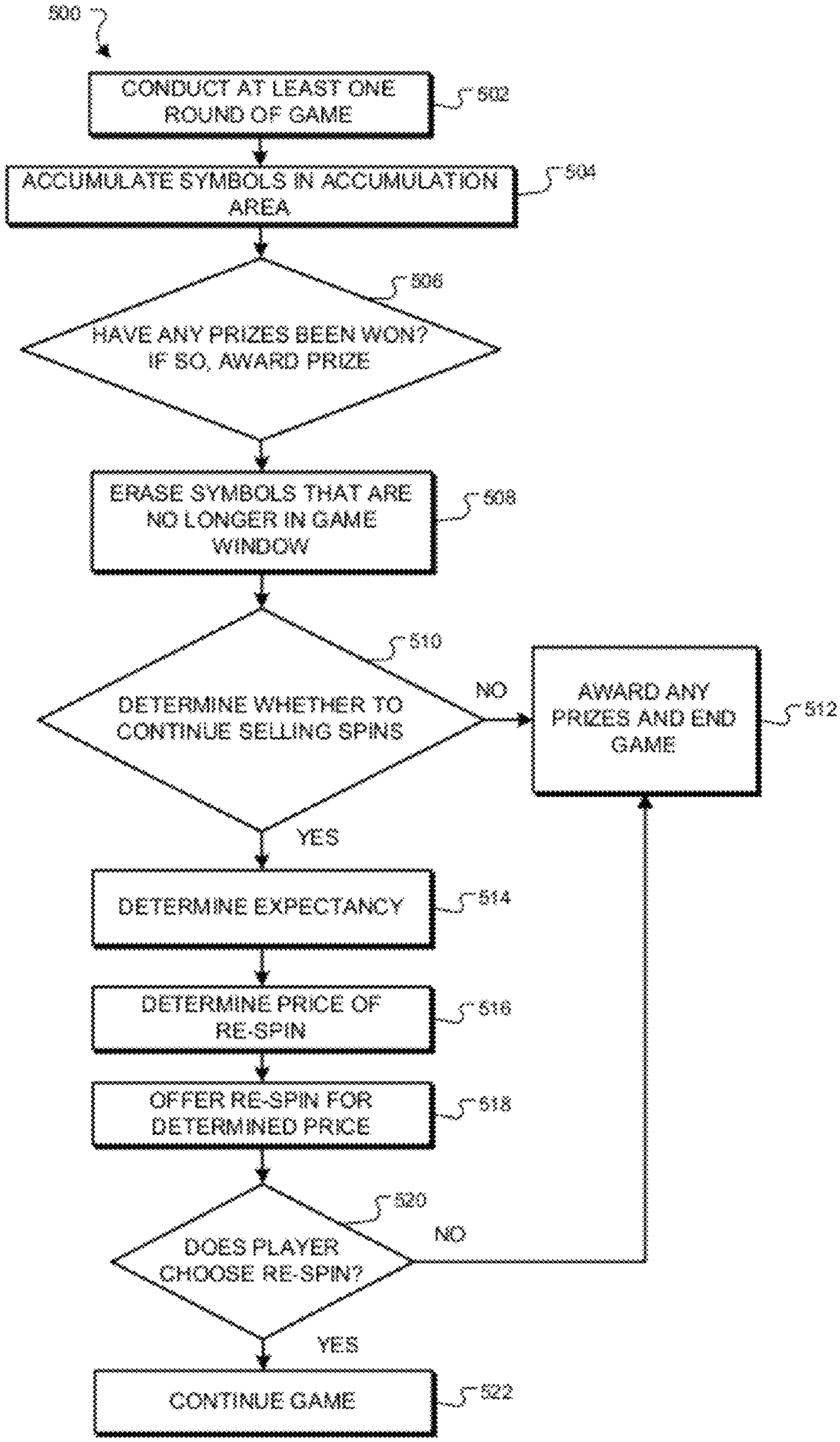
FIG. 5 is a flow chart of a method for determining winnings

FIG. 5 is a flow chart of a process for another embodiment, in which re-spins are offered for purchase during a base game, rather than a bonus game. Because target symbols could not be continuously accumulated from a base game, the target symbols are accumulated only within a moving window. The game works by offering a re-spin available for purchase if an accumulated target symbol is (within a moving window of, for example, the last 10 spins) within a certain threshold. For example, if the designated number of spins is 10, only the target symbols for the last 10 spins will be accumulated. In this manner, if the player can see that they have accumulated a large number of target symbols that almost qualify for an award, but are about to expire, they can wager for a chance to make the award. Another variation that can provide the "buy a free spin" feature in a base game is to provide that each round of a base game (each wager and responsive game play) comprises multiple spins that can accumulate symbols. In that case, symbols can only be accumulated within a round.

Referring again to the process 500 in FIG. 5, the process begins in step 502, where at least one round of the base game is conducted. After the round is conducted, the process accumulates any target symbols in a moving window with a previously defined size of spins in the designated area in step 504. In step 506 the process determines if any prizes have been won. If any prizes have been won, the process awards them. After awarding any prizes, the process moves to step 508, where all accumulated symbols in excess of the previously defined size of spins are expired and removed from the display of accumulated target symbols. Thus, as in the previous example, only the target symbols from the last five spins are kept, and any target symbols accumulated at least six spins ago are erased. In step 510, the process determines whether the accumulated target symbols are almost sufficient to qualify for an award. If the process determines that there are not enough symbols to almost qualify for an award, then in step 512 the process awards any prizes and ends the game. At step 514, the expectancy is taken into account. If the process determines that there are almost enough target symbols to qualify for an award, then in step 516 the process determines the price at which to offer a re-spin wager, based at least partially on the expectancy, similarly to the manner described with regard to FIG. 4. In step 518 the process offers the re-spin for the calculated price. If the player does not use the re-spin in step 520, then the process moves to step 512 where any prizes are awarded and the re-spin portion of the game is ended. If the player uses the re-spin, at step 522 the re-spin is conducted. In one or more embodiments the re-spins are iterative, meaning that they may continue to be offered, but with prices updated based on expectancy, for a designated number of re-spins. After the re-spin is conducted and any awards achieved therein are awarded, the target symbols that would have expired without the free spin (those that were not produced within a previously set number of spins as determined by the moving window) are removed from the accumulated symbols and the base game continues.

Figure 6:
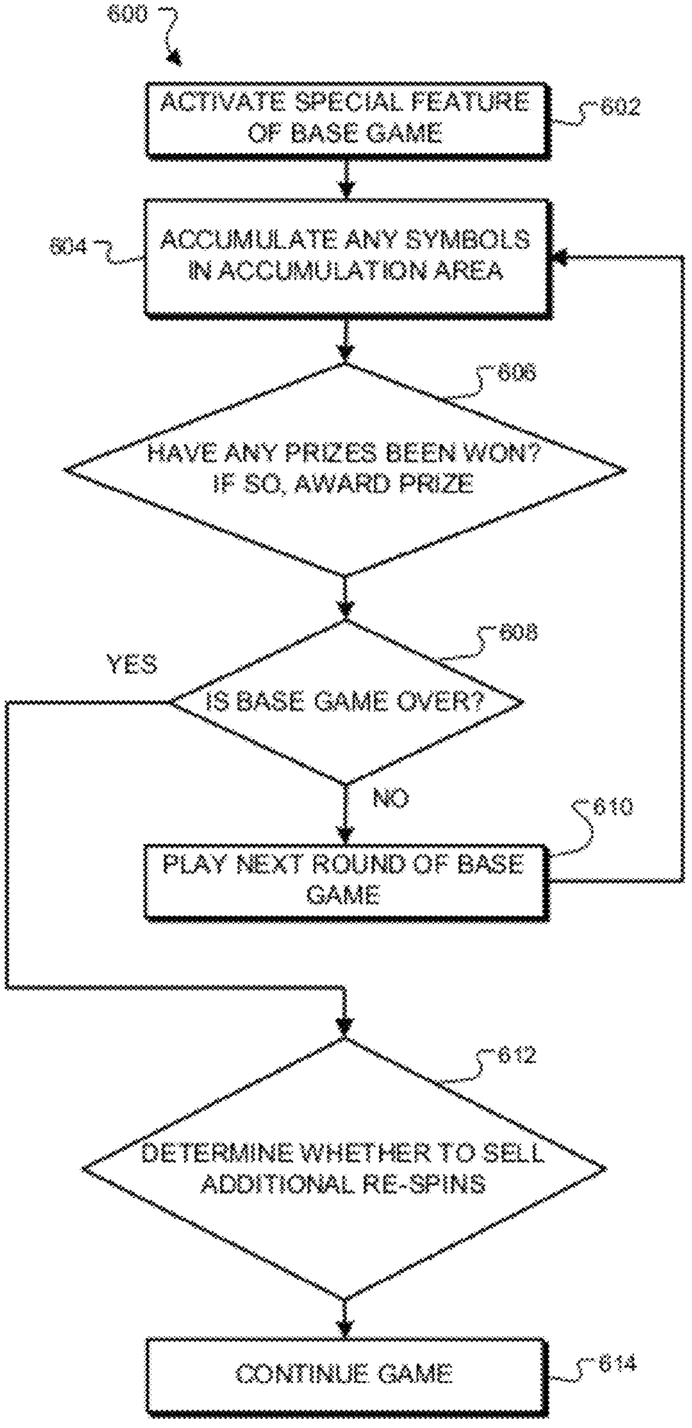
FIG. 6 is another a flow chart of the game according to another embodiment.

FIG. 6 is another flow chart for a game process according to another embodiment. In this embodiment, the re-spin feature is offered as part of a base game, but as a special feature of the base game which is activated by some triggering event, such as, for example, a scatter pattern. After a trigger pattern, the base game continues with the added feature that the respective target symbol is accumulated for a certain number of spins. A re-spin is offered according to the methods taught herein.

The process 600 starts at step 602, the special feature process is activated by a trigger. There are many ways this can be done. One way is for the player to pay to have it triggered, or it can also be triggered by a special symbol or pattern. In step 604, the process indicates that the respective target symbol is accumulated. Then in step 606 the process determines if any prizes have been won and awards them. Then in step 608, the process determines if the base game is over. If the base game is not over, then the process continues in step 610 and continues playing the base game. After the next round of the base game, the process returns to step 604 and accumulates any target symbols. If the process determines that the base game is over in step 608, then the process moves to step 612 where it determines whether to sell any re-spins. The re-spins are offered as an optional wager to the player according to the methods described herein. After all purchased re-spins are conducted and any prizes awarded, the special feature ends at step 614 and the normal play of the base game resumes.

Figure 7:
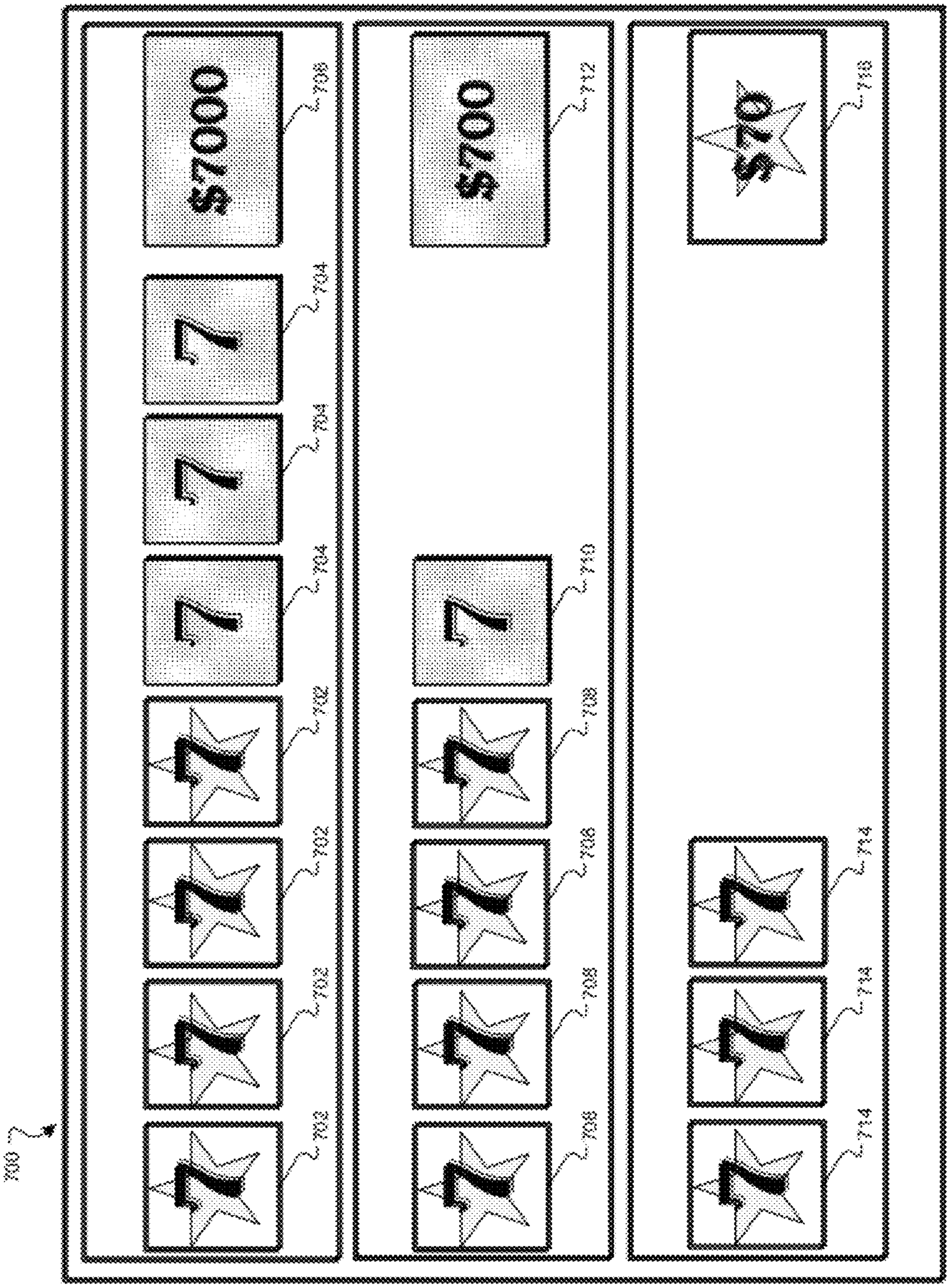
FIG. 7 is a view of the target symbol accumulation area according to an embodiment.

FIG. 7 is an illustration of the target symbol accumulation area 700, which appears on a game display such as, for example, the secondary display 107 of FIG. 1. FIG. 7 shows the target symbol accumulation area that goes with the game play area screen depicted in FIG. 8 and FIG. 9. In this example display 700, the target symbols are represented by blue sevens (702 & 704), yellow sevens (708 & 710), and red sevens (714). (The colors of course cannot be shown on the black & white drawings, but embodiments of the game may use color target symbols.) In this example, the symbols are depicted in a state to explain the various possible outcomes for a particular target symbol. The red sevens 714 have qualified for an award. The yellow sevens (708 and 710) are within the threshold to "almost" qualify for an award, and the blue sevens (702 and 704) are outside of the threshold. While the display does not show a threshold, an indication of the threshold may be shown in some manner such as, for example, a zone of a particular color. For the example below, assume the threshold is one symbol for red, one symbol for yellow, and two symbols for blue. On the right of the target symbols are the accumulation awards, which are the prizes associated with the respective target symbols. The prize for the blue sevens is $7000 (706). The prize for the yellow sevens is $700 (712). The prize for the red sevens is $70 (716). In the row of blue sevens, there are four accumulated blue sevens 702. The player however needs to accumulate three more blue sevens as represented by the unlit sevens 704. Therefore the prize of $7000 (706) remains un-awarded and unlit. The player also does not have "almost enough" blue sevens, so the process will not offer a re-spin because of the blue sevens. In the row of yellow sevens, there are four accumulated yellow sevens (708). The player almost has enough yellow sevens as the player only needs to accumulate one more yellow seven represented by the unlit seven (710). Therefore the prize of $700 (712) remains un-awarded and unlit. In the case of the yellow sevens however, the player has almost accumulated enough yellow sevens to win a prize, and is therefore within the threshold where a re-spin will be offered. In the row of the red sevens there are three accumulated red sevens (714), and no unlit red sevens. In this case the player has won the $70 prize (716). Therefore the prize of $70 (716) lights up, and is awarded.

Figure 8:
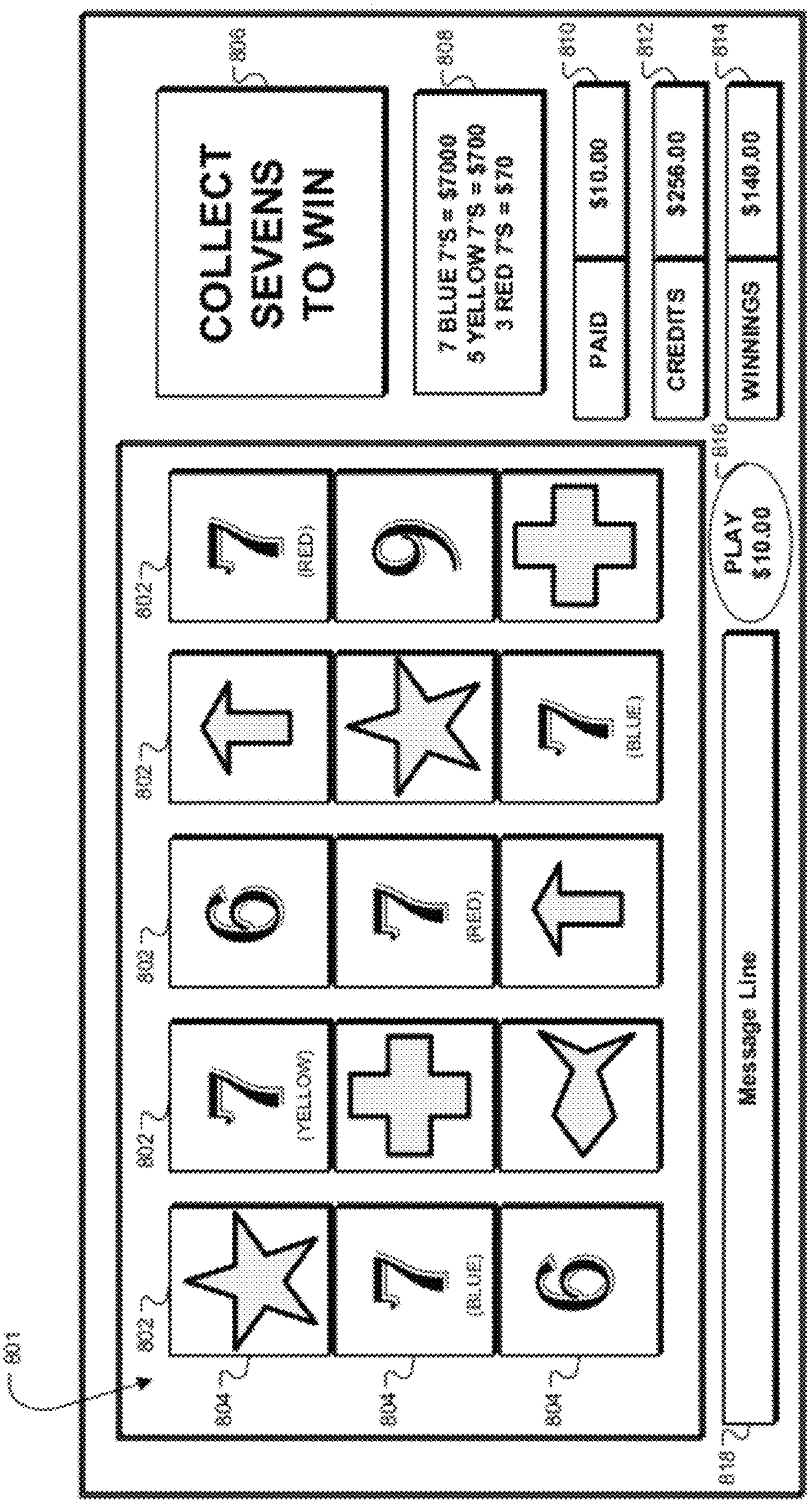
FIG. 8 is a view of one instance of a base game display.

FIG. 8 depicts the game play area displaying the results generated by the game which accompanies FIG. 7. The gaming area is represented as a matrix 801 of symbol locations arranged in rows and columns to represent simulated slot machine reels. Other embodiments may, of course, use other types of game displays to accumulate symbols according to the methods herein. Components 802 represent the simulated reels, while symbols are designated 804. In this instance there are five reels, but the game can be played with more and less reels. There are also three symbols per reel. On the right in box 806 are the instructions for playing the game. Underneath the instructions, in box 808, are the prizes that can be won as well as the requirements for winning them. In this embodiment, the depicted screen is achieved as part of a free spin bonus round of a designated length, triggered by some event in the base game. Each spin in the bonus round has a specified chance of including one or more of the target symbols. As the free spins in the bonus round are each used, an indicator is displayed to the player such as at the message line area 818, which could read, for example, "5 Spins Remaining " Under box 808 is box 810, which displays credits paid out most recently. Under box 810 is box 812, which displays any credits in the players account. Under box 812 is box 814, which displays the player's winnings To the left of box 814 in component 816, is the price of the base game play. In the bottom left-hand corner there is a message line, where the game station can display further instructions to the player.

Figure 9:
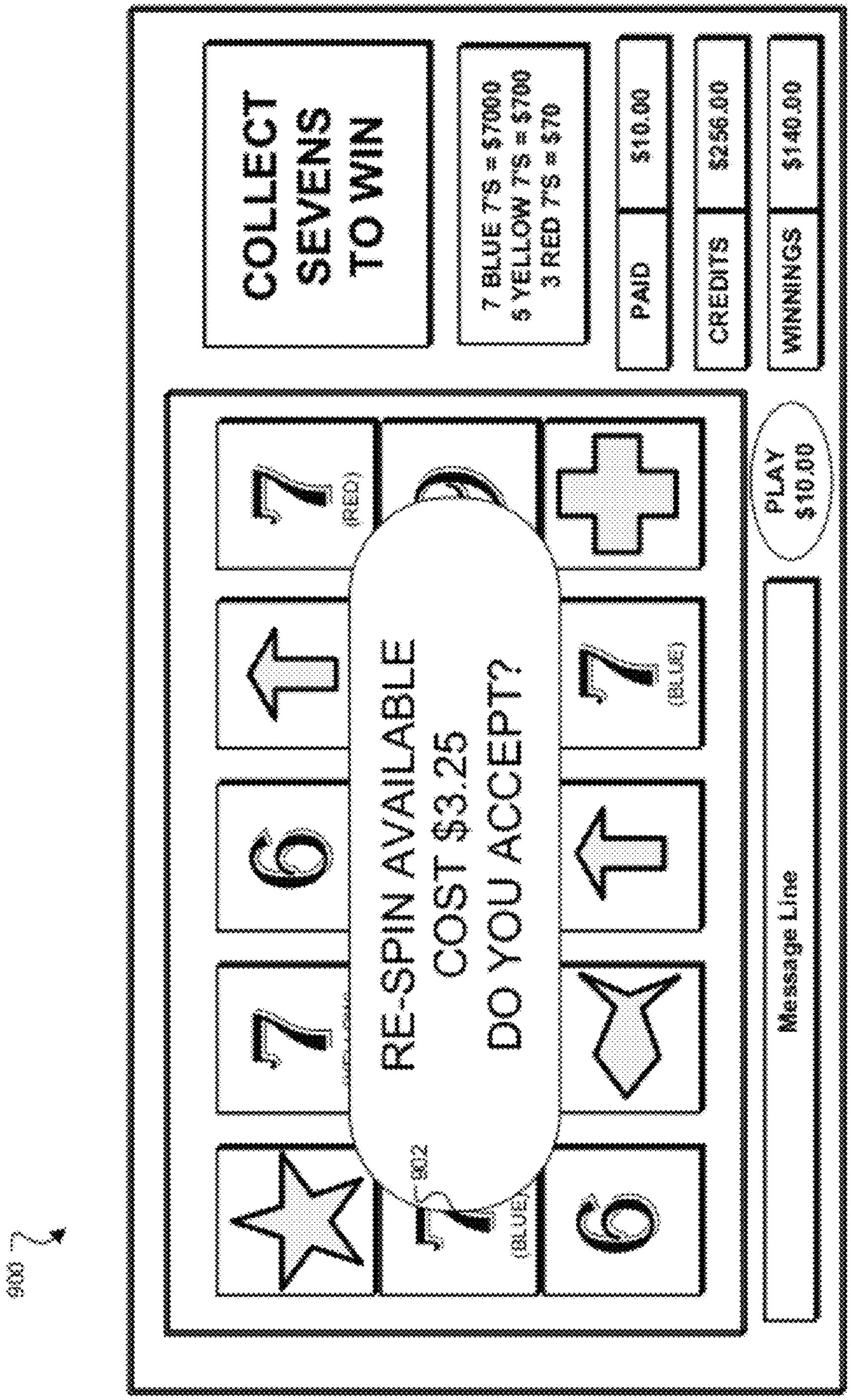
FIG. 9 is a view of the base game display offering a re-spin.

FIG. 9 is another representation of the game play area of FIG. 8, displaying the results generated by the game seen in FIG. 8. This one however is using bubble 902 to inform the player of a re-spin, and the price of the re-spin. The bubble is also prompting the player to choose the re-spin or not.

As used herein, the terms "comprising," "including," "carrying," "having," "containing," "involving," and the like are to be understood to be open-ended, that is, to mean including but not limited to.

Any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

The features herein may be used in any functional sub-combination. The description should be interpreted as providing support for each functional sub-combination of features. For example, this application supports all sub-combinations of features as if all of the claims were written in multiple dependent form as is common in European practice.

The above described illustrative embodiments are intended to illustrate the principles of the invention, but not to limit the scope of the invention. Various other embodiments and modifications to these illustrative embodiments may be made by those skilled in the art without departing from the scope of the present invention.

The invention claimed is:

1. A method of providing a wagering game, the method comprising:

(a) receiving a game play request with an associated wager, at a gaming machine including an electronic display and an electronic processor operatively connected to control the gaming machine and the electronic display;

(b) at some point after the game play request and in response to the game play request, causing the electronic display to a matrix of symbol locations comprised of multiple reels each including one or more symbol locations;

(c) under control of the electronic processor, conducting a designated number of spins of the reels on the electronic display, each spin producing a spin result, each spin result having a chance to include one or more target symbols of one or more types;

(d) in response to a spin result including a target symbol, for each respective target symbol of the one or more types included in the spin result, under control of the electronic processor displaying on the electronic display an indication that the respective target symbol is accumulated, the indication being displayed in a designated display area, outside of the matrix of symbol locations, for its respective target symbol type;

(e) after the designated number of spins of the reels have been exhausted, under control of the electronic processor automatically determining whether the amount of accumulated target symbols in the designated display area outside of the matrix of symbol locations of any of the symbol types are within a designated threshold such that they almost qualify for an award;

(f) under control of the electronic processor, determining a price of a re-spin of the reels, by determining an expected value for the re-spin considering how close the player is to achieving an award for each of the symbol types and choosing the price based at least in part on the expected value;

(g) under control of the electronic processor, displaying on the electronic display a notification indicating availability of a re-spin of all of the reels for a wager of the determined price;

(h) receiving a further wager at the determined price for the re-spin of all of the reels;

(i) in response to receiving the further wager, under control of the electronic processor, conducting the re-spin to produce a re-spin result, the re-spin result having a chance to include one or more target symbols of one or more types;

(j) in response to the re-spin producing one or more respective target symbols of the one or more types, under control of the electronic processor, displaying on the electronic display an indication that the respective target symbols have been accumulated in the designated display area outside of the matrix of symbol locations.

2. The method of claim 1, further including repeating steps (e)-(j) multiple times.

3. The method of claim 1, wherein the re-spin is offered when the indication that the respective target symbol is accumulated is one symbol away from a quantity needed to qualify for the award.

4. The method of claim 1, wherein the price of the re-spin is determined by setting the price equal to the expected value of the re-spin.

5. The method of claim 1, wherein the price of the re-spin is determined by setting the price equal to the expected value of the re-spin plus a house premium amount to the price of the re-spin.

6. The method of claim 1, wherein the re-spin is conducted in a bonus round which is configured to end when the player declines to make a further wager or when the accumulated target symbols are not within the designated threshold.

7. The method of claim 1, wherein the re-spin is conducted in a base game round, and wherein the game play request is entitled to a base game play round including the designated number of spins, and wherein the step of indicating that the respective target symbol is accumulated and the step of offering the re-spin are special features of the base game.

8. The method of claim 1, wherein the designated threshold is set to a different amount for at least one of the respective target symbol types.

9. A system for providing a wagering game, the system comprising:

(a) a player interface configured for receiving a game play request with an associated wager;

(b) a video display device configured for, at some point after the game play request and in response to the game play request, displaying a matrix of symbol locations comprised of multiple reels each including one or more symbol locations;

(c) a game controller configured for determining game play results for a designated number of spins of the reels, each spin producing a spin result, each spin result having a chance to include one or more target symbols of one or more types;

(d) a secondary video display device configured for displaying an indication that the respective target symbol is accumulated in response to a spin result including a target symbol, the indication being displayed in a designated display area, outside of the matrix of symbol locations, for its respective target symbol type;

(e) the game controller configured for further automatically determining whether an amount of accumulated target symbols in the designated display area outside of the matrix of symbol locations of any of the symbol types is within a designated threshold such that it almost qualifies for an award after the designated number of spins of the reels have been exhausted;

(f) the game controller further configured for determining a price of a re-spin of the reels, by determining an expected value for the re-spin considering how close a player is to achieving an award for each of the one or more symbol types and choosing the price based at least in part on the expected value;

(g) the video display device for displaying a notification indicating availability of the re-spin of all of the reels, including the previously determined price;

(h) the player interface further configured for receiving a further wager at the determined price for the re-spin of all of the reels;

(i) the game controller further configured for conducting the re-spin to produce a re-spin result in response to receiving the further wager; the re-spin result having a chance to include a respective additional one or more target symbols of one or more types; and (j) the secondary video display device further configured for, in response to the re-spin producing one or more respective target symbols of the one or more types, displaying an indication that the respective target symbols have been accumulated in the designated display area outside of the matrix of symbol locations.

10. The system of claim 9, wherein the game controller is further configured to offer the re-spin when accumulation of the one or more target symbols is one symbol away from a quantity needed to qualify for an award.

11. The system of claim 9, wherein the game controller is configured to determine the price of the re-spin by setting the price equal to the expected value of the re-spin.

12. The system of claim 9, wherein the game controller is configured to determine the price of the re-spin by setting the price equal to the expected value of the re-spin plus a house premium amount to the price of the re-spin.

13. The system of claim 9, wherein the game controller is further configured to allow a base game play round including the designated number of spins, and the secondary video device allows the step of indicating that the respective target symbol is accumulated, and offering the re-spin, and wherein the indication that the respective target symbol is accumulated is maintained by the secondary video device only for a previously defined number of spins.

14. The system of claim 9, wherein the designated threshold is set to a different amount for at least one of the respective target symbol types.

15. A tangible non-transitory computer readable medium storing a program product, the program product including computer executable program code executable for:

(a) receiving a game play request with an associated wager at a gaming machine;

(b) displaying a matrix of symbol locations comprised of multiple reels each including one or more symbol locations at some point after the game play request and in response to the game play request;

(c) determining game play results for a designated number of spins of the reels, each spin producing a spin result, each spin result having a chance to include one or more target symbols of one or more types and;

(d) in response to a spin result including a target symbol and for each respective target symbol of the one or more types included in the spin result, displaying an indication that the respective target symbol is accumulated in a designated display area, outside of the matrix of symbol locations, for its respective target symbol type;

(e) automatically determining whether the amount of accumulated target symbols in the designated display area outside of the matrix of symbol locations of any of the symbol types are within a designated threshold such that they almost qualify for an award after the designated number of spins of the reels have been exhausted;

(f) determining a price of a re-spin of the reels, by determining an expected value for the re-spin considering how close the player is to achieving an award for each of the one or more symbol types and choosing the price based at least in part on the expected value;

(g) displaying a notification indicating availability of the re-spin of the reels, including the previously determined price;

(h) receiving a further wager at the determined price for the re-spin of all of the reels;

(i) conducting the re-spin to produce a re-spin result of all of the reels, the re-spin result having a chance to include one or more target symbols of one or more types, in response to receiving the further wager; and (j) in response to the re-spin, producing one or more respective target symbols of the one or more types, displaying an indication that the respective target symbols have been accumulated in the designated display area outside of the matrix of symbol locations.

16. The medium storing a program product of claim 15, wherein the program code is further executable for offering the re-spin when the accumulation of the one or more target symbols of one or more types is one symbol away from a quantity needed to qualify for an award.

17. The medium storing a program product of claim 15, wherein the program code is further executable for determining the price of the re-spin by setting the price equal to the expected value of the re-spin.

18. The medium storing a program product of claim 15, wherein the program code is further executable for determining the price of the re-spin by setting the price equal to the expected value of the re-spin, and adding a house premium amount to the price of the re-spin.

19. The medium storing a program product of claim 15, wherein the program code is further executable for conducting the re-spin in a bonus round which is configured to end when the player declines to make a further wager or when the accumulated target symbols are not within the designated threshold.

20. The medium storing a program product of claim 15, wherein the program code is further executable to allow the game play request to be entitled to a base game play round comprising the designated number of spins and wherein the program code maintains the target symbols for only a previously defined number of spins.

* * * * *